United States Patent Office 3,611,576
Patented Oct. 12, 1971

3,611,576
ATTACHMENT DEVICE FOR FITTING TO THE END OF A MEASURING TAPE OR THE LIKE
Andre Quenot, Besancon, France, assignor to Quenot & Cie S.a.r.l., Besancon, France
Filed Sept. 22, 1969, Ser. No. 859,803
Claims priority, application France, Nov. 7, 1968, 172,852
Int. Cl. G01b 3/10
U.S. Cl. 33—137          6 Claims

ABSTRACT OF THE DISCLOSURE

An attachment device for fitting to the end of a measuring tape or the like comprises a plate fixable to the end of the tape and having a free end adjacent the end of the tape. A hook is pivotably attached to the free end of the plate and arranged to pivot between an open position inclined to the plane of the tape and a closed position parallel to the plane of the tape and in contact with said plate. The hook has at least one tongue-like portion extending with the long axis thereof perpendicular to the pivot of the hook and having its free end adjacent the plate. A portion of the end of the plate opposite said free end of the tongue constitutes an abutment having surfaces perpendicular to and in contact with the end of said tongue portion of the hook in its respective open and closed positions.

---

The invention relates to an attachment device comprising a retractable hook or catch fixed to the end of a tape measure and comprising a plate fixed to the end of the tape and to which the hook or catch is pivotally attached. When the hook is open, the end of a tape fitted with such a device, can be positioned against one corner of an object to be measured.

There are certain known devices of this type which comprise a spring-actuated ratchet which is fixed, by means of a rivet, on the plate to which the axis of the hook is attached and which acts on the hook to keep the hook firmly in either the open or the closed position. These known devices have the inconvenience of necessitating the inclusion of the ratchet parts in addition to the reinforcing plate and a hook, thus increasing the price and the difficulty of construction of the device. Moreover, the end of a measuring tape provided with such a hook is appreciably thick and therefore is clumsy. It appears, in particular, that the spring and its fixing mechanism are relatively expensive if it is considered that such fixing devices should be mass-produced in a very economical manner.

According to the invention it is proposed to remedy these disadvantages.

The coupling device according to the invention does not require any spring-operated ratchet, nor any parts except for the plate and the hook; however, the hook can be positively maintained in either a closed or opened position, and the device according to the invention has a thickness less than that of known devices of this kind, which permits the exact positioning of the free end of the tape, by means of the hook, against one of the ends of the distance to be measured.

A hooking device according to the invention comprises a plate fixable to the end of a tape; a hook pivotably attached to the free end of the plate and arranged to pivot between an open position at an angle to the plate of the tape and a closed position parallel to the plane of the tape and in contact with said plate, the hook having at least one tongue-like portion extending with the long axis of the tongue perpendicular to the pivotal axis of the hook and having its free end adjacent the plate; and at least the portion of the end of the plate opposite said free end of the tongue constituting an abutment having surfaces perpendicular to and in contact with the end of said tongue portion of the hook in its respective open and closed positions.

The term "hook" is used herein to refer to a part which enables the end of the tape to be hooked or attached around an object; it does not imply that the hook used be curved, and indeed, as shown in the drawing, the hook is preferably flat so as to fit against the tape in its closed position.

The hook is preferably provided either with two slots arranged in the direction of its length and defining the tongue elastic portion or with a single slot defining a lateral tongue. The abutment arranged at the front end of the plate and which co-operates with the tongue portion of the hook is preferably in the middle of the front of the plate, and the remaining portions of the front of the plate are preferably rounded.

The invention will be further described with reference to a preferred embodiment of the device thereof as shown in the accompanying drawings, in which.

Figure 1:
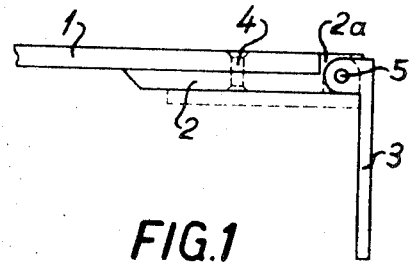
FIG. 1 is a view of the side of a device according to the invention in which the open position of the hook is shown in full line and the closed position in broken line.
Figure 2:
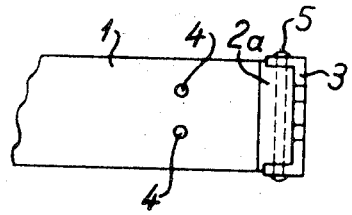
FIG. 2 is a view of the top of the open device.
Figures 4, 5:
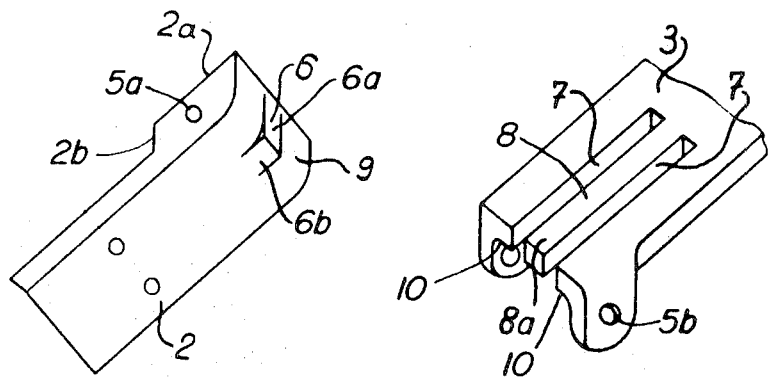
FIG. 4 is a perspective view of the end of the plate of the device.
FIG. 5 is a perspective view of the portion of the hook which co-operates with the plate.

Referring first to FIGS. 1 and 2 a measuring tape 1 is fixed at one of its ends to a reinforcing plate 2, preferably made of metal, by means of rivets 4. The plate 2 includes a portion 2a of greater thickness than the remainder, the edge of which portion forms a shoulder 2b in contact with the end of the tape 1. A hook 3 is mounted on the plate 2a by means of a spindle 5 passing through appropriate holes (5a, 5b, see FIGS. 4 and 5) in the plate and lateral ear portion 3a of the hook. Referring to FIG. 4, the front of the part 2a of the plate has in its middle a step or abutment 6 having flat surfaces 6a and 6b perpendicular to the plane of the hook in its open or closed position. The surface 6b merges into the lower face of the plate. On each side of the abutment 6 are surfaces 9 which constitute smoothly curved shoulders joining the end and lower faces of the plate 2.

Figure 3:
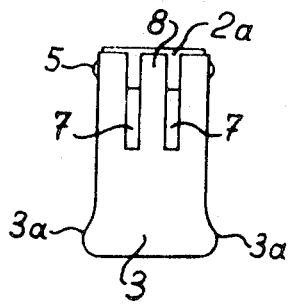
FIG. 3 is an end view of the open device.

Referring now to FIGS. 3 and 5, two slots 7 are formed in the longitudinal direction of the hook and define between them a tongue-shaped portion 8 having a free end 8a. The extreme end of this tongue 8 contacts one of the two surfaces 6a or 6b of the abutment, according to whether the hook is in its open position or its closed position. At least the hook portion of the device should be made of material, such as tempered steel, or other metal, which is resilient; the hook is then held firmly in one or other positions by the springiness of the tongue 8 against the abutment 6. To change the position of the hook it is necessary to pivot the tongue 8 around the abutment 6 whilst elastically deforming the tongue 8 by exerting a certain pressure on the hook. The faces 10 of the side portions of the hook move unimpededly during each pivoting over the surfaces 9.

As shown in FIG. 3, the edges of the hook 3 can have lateral enlargements 3a which extend a little way on each side of the plate, and these permit the hook to be readily grasped by the fingers when it is in its closed position. As an alternative means of facilitating the opening of the hook from its closed position, grooves may be formed in the two edges of the hook to permit insertion of the finger nail.

In another form of the device, only one slot may be formed in the hook, for example down the middle of the hook, and extending along part of its length, so as to delimit a lateral tongue which abuts against the abutment 6 which must be positioned opposite the tongue.

Although the open position of the hook is shown in the drawings as being at 90° to the closed position and to the plane of the tape, it could alternatively be at a different angle, e.g. 80° or 70°, which might be advantageous for some uses.

Other variations may also be made in the device of the invention within the limits of the appended claims.

What is claimed is:

1. An attachment device for fitting to the end of a measuring tape or the like, consisting of a plate fixable to the end of the tape and having a free end adjacent the end of the tape and a hook pivotably attached to the free end of the plate at the sides thereof and arranged to pivot between an open position at an angle to the plane of the tape and a closed position parallel to the plane of the tape and in contact with said plate, the hook having at least one integral resilient tongue-like portion extending with the long axis of the tongue-like portion perpendicular to the pivot of the hook and having its free end adjacent the free end of the plate, and at least the portion of the free end of the plate opposite said free end of the tongue constituting an abutment having angularly disposed surfaces perpendicular to and in contact with the free end portion of said tongue portion of the hook in its respective open and closed positions.

2. A device as claimed in claim 1, wherein said tongue is located centrally of the hook, and the abutment is centrally of the free end of the plate.

3. A device according to claim 1, wherein the tongue is delimited from the remainder of the hook by at least one slot extending from the pivoted end of the hook and extending part of the way towards the opposite end of the hook.

4. A device as claimed in claim 3, wherein said tongue-shaped portion is delimited by two parallel slots.

5. A device as claimed in claim 2 wherein at the edges of the hook are laterally projecting means to facilitate manually grasping the hook when the hook is in its closed position.

6. In combination, a measuring tape and an attachment device for said measuring tape, said attachment device consisting of a plate fixedly connected to one end of said measuring tape, said plate having a free end adjacent said one end of the tape, a hook pivotably attached to the free end of the plate at the sides thereof and arranged to pivot between an open position at an angle to the plane of the tape and a closed position parallel to the plane of the tape and in contact with said plate, the hook having at least one integral resilient tongue-like portion extending with the long axis of the tongue-like portion perpendicular to the pivot of the hook and having its free end adjacent the free end of the plate, and at least the portion of the free end of the plate opposite said free end of the tongue constituting an abutment having angularly disposed surfaces perpendicular to and in contact with the free end portion of said tongue portion of the hook in its respective open and closed positions.

References Cited
UNITED STATES PATENTS

| | | | |
|---|---|---|---|
| 841,272 | 1/1907 | Read | 33—137 |
| 2,574,272 | 11/1951 | McCully | 33—137 |
| 2,629,935 | 3/1953 | Roe | 33—137 |

LEONARD FORMAN, Primary Examiner

G. G. KUEHL, Assistant Examiner